(12) United States Patent
Shimada et al.

(10) Patent No.: US 9,557,870 B2
(45) Date of Patent: Jan. 31, 2017

(54) ELECTROSTATIC CAPACITANCE-TYPE POSITION DETECTION DEVICE

(71) Applicant: ALPS ELECTRIC CO., LTD., Tokyo (JP)

(72) Inventors: Naoya Shimada, Miyagi-ken (JP); Hiroshi Shigetaka, Miyagi-ken (JP)

(73) Assignee: ALPS ELECTRIC CO., LTD., Tokyo (JP)

(*) Notice: Subject to any disclaimer, the term of this patent is extended or adjusted under 35 U.S.C. 154(b) by 66 days.

(21) Appl. No.: 14/615,107

(22) Filed: Feb. 5, 2015

(65) Prior Publication Data

US 2015/0247943 A1 Sep. 3, 2015

(30) Foreign Application Priority Data

Feb. 28, 2014 (JP) .................................. 2014-037935

(51) Int. Cl.
*G06F 3/044* (2006.01)
*G01V 3/00* (2006.01)
*G06F 3/041* (2006.01)

(52) U.S. Cl.
CPC ............. *G06F 3/044* (2013.01); *G06F 3/0418* (2013.01)

(58) Field of Classification Search
CPC combination set(s) only.
See application file for complete search history.

(56) References Cited

U.S. PATENT DOCUMENTS

2010/0182258 A1* 7/2010 Jung ....................... G06F 3/044
345/173
2011/0261003 A1* 10/2011 Lee ..................... G02F 1/13338
345/174

FOREIGN PATENT DOCUMENTS

JP 2013-222384 10/2013

* cited by examiner

*Primary Examiner* — Clayton E Laballe
*Assistant Examiner* — Jas Sanghera
(74) *Attorney, Agent, or Firm* — Brinks Gilson & Lione (57) ABSTRACT

In an electrostatic capacitance-type position detection device, a corresponding ground region is formed at an intersection point between a corresponding first virtual center line and a corresponding second virtual center line, and a corresponding detection electrode and a corresponding drive electrode are disposed on the outer side of the relevant ground region. The detection electrodes each include a first electrode line and a second electrode line that extend in a second direction and are disposed so as to sandwich therebetween the ground regions from a first direction. The drive electrodes are each configured by arranging electrode patterns in order in the first direction. The electrode patterns each include a third electrode line that extends in the second direction, and a fourth electrode line and a fifth electrode line that are located on both respective ends of the third electrode line and extend in the first direction.

10 Claims, 5 Drawing Sheets

ELECTROSTATIC CAPACITANCE-TYPE POSITION DETECTION DEVICE

CLAIM OF PRIORITY

This application claims benefit of priority to Japanese Patent Application No. 2014-037935 filed on Feb. 28, 2014, which is hereby incorporated by reference in its entirety.

BACKGROUND

1. Field of the Disclosure

The present disclosure relates to an electrostatic capacitance-type position detection device that includes a contact surface, with which a pointing body such as a fingertip of an operator can come into contact, and detects the contact position of the pointing body on the contact surface.

2. Description of the Related Art

In recent years, along with the popularization of mobile terminals such as notebook-size personal computers (notebook PCs) and cellular phones, there have been used position input devices as operation devices. In many cases, the position detection devices each including a contact surface, with which a fingertip of an operator or the like can come into contact, and detecting the contact position of the fingertip or the like on the contact surface. The position input devices are commonly used for touch pads or the like for input to personal computers, and are also applied to touch panels of portable devices, various terminal devices, and so forth, using transparent substrates and transparent electrodes.

As such position input devices, there have been electrostatic capacitance-type position input devices that each detect the contact position of a fingertip on a contact surface, based on a change in electrostatic capacitance. In a case of utilizing one of the relevant position input devices as a device for moving a cursor, a user is able to move the cursor only by gently tracing the contact surface. Therefore, the position input devices are easy to use and preferred by many users. As the related art, there has been disclosed Japanese Unexamined Patent Application Publication No. 2013-222384.

In recent years, the electrostatic capacitance-type position detection devices mounted in notebook PCs and so forth have been desired to grow in size and be reduced in price. In order to satisfy such demands, it is desirable to increase the pitch of an electrode and to keep down the number of electrodes. However, there has been a problem that position detection accuracy is deteriorated if the pitch of an electrode is increased.

In an electrostatic capacitance-type position detection device including drive electrodes, detection electrodes, and ground electrodes, electrostatic capacitance between the corresponding drive electrode and the corresponding detection electrode is reduced by bringing a finger close thereto, and the reduction amount thereof is detected for each electrode, thereby detecting a position.

However, in such an electrostatic capacitance-type position detection device, there has been a problem that the point of intersection between the corresponding drive electrode and the corresponding detection electrode becomes a portion whose sensitivity is the highest and if the electrode pitch is increased, a sensitivity variation due to a position becomes large and position detection accuracy is deteriorated.

In addition, while largely functioning as a ground conductor for reducing electrostatic capacitance between the corresponding drive electrode and the corresponding detection electrode, the pointing body such as a finger also largely functions as a floating conductor that increases the electrostatic capacitance between the corresponding drive electrode and the corresponding detection electrode. This function as the floating conductor causes a detection error (inversion sensing error), and poses an obstacle to the enhancement of detection accuracy.

The present invention solves the above-mentioned problems, and provides an electrostatic capacitance-type position detection device capable of suppressing the variation of position sensitivity and the inversion sensing error and obtaining high position detection accuracy in a case of increasing the electrode pitch.

SUMMARY

An electrostatic capacitance-type position detection device includes a plurality of first electrodes arranged in parallel with one another in a first direction and disposed in a substrate so as to extend in a second direction perpendicular to the first direction, a plurality of second electrodes arranged in parallel with one another in the second direction on the substrate and disposed in the substrate so as to extend in the first direction, and a ground electrode disposed in the substrate, wherein one electrode out of each of the first electrodes and each of the second electrodes is electrically driven, an electric output of the other electrode is detected, and a position to which an object is close on the substrate is detected based on the detection result, wherein at an intersection point between a first virtual center line of each of the second electrodes, which is parallel to the first direction, and a second virtual center line of each of the first electrodes, which is parallel to the second direction, the ground electrode has a ground region within which the intersection point is located when the substrate is viewed in plan, the corresponding first electrode is disposed on an outer side of the ground region, and the corresponding second electrode is disposed on an outer side of the corresponding first electrode with respect to the corresponding intersection point.

According to this configuration, the ground region is formed in the above-mentioned intersection point and the corresponding first electrode and the corresponding second electrode are formed on the outer sides thereof. Therefore, it is possible to effectively inhibit the sensitivities of intersection points from becoming excessively high in such a manner as in the related art, and it is possible to effectively inhibit a sensitivity variation from occurring. In other words, according to this configuration, portions whose sensitivities are high are distributed around the individual intersection points. Therefore, even in a case where an electrode pitch is increased, it is possible to suppress a sensitivity variation due to a position, and it is possible to enhance position detection accuracy.

DESCRIPTION OF THE EXEMPLARY EMBODIMENTS

<First Embodiment>

Figure 1:
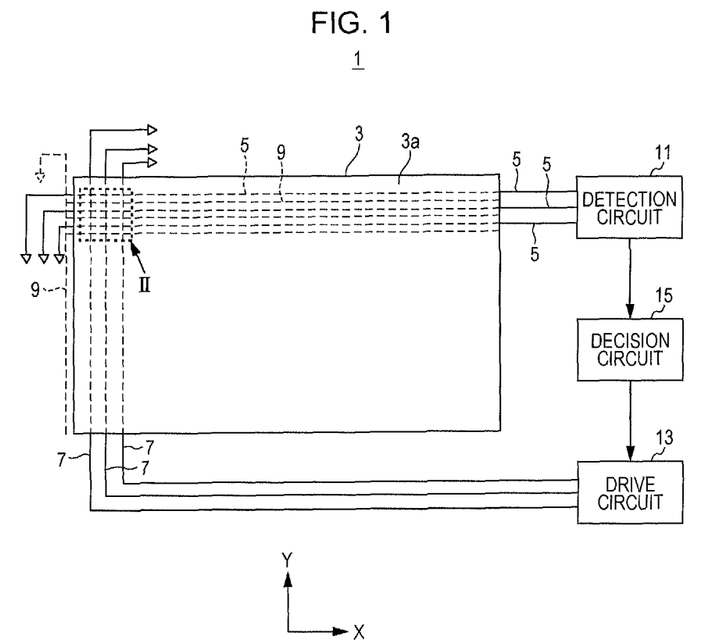
FIG. 1 is a configuration diagram of an electrostatic capacitance-type position detection device according to a first embodiment of the present invention.

FIG. 1 is the configuration diagram of an electrostatic capacitance-type position detection device 1 according to an embodiment of the present invention.

In the present embodiment, an X direction and a Y direction are examples of a second direction and a first direction, respectively, of the present invention, a first virtual center line 31 is an example of a first virtual center line of the present invention, and a second virtual center line 33 is an example of a second virtual center line of the present invention.

In addition, detection electrodes 5, drive electrodes 7, and ground electrodes 9 are examples of first electrodes, second electrodes, and ground electrodes, respectively, of the present invention. In addition, ground regions 19 are examples of ground regions of the present invention. In addition, intersection points 35 are examples of intersection points of the present invention.

As illustrated in FIG. 1, in the electrostatic capacitance-type position detection device 1, the detection electrodes 5, the drive electrodes 7, and the ground electrodes 9 are formed on the surface of an insulating substrate 3. The electrostatic capacitance-type position detection device 1 is used for a touch pad or the like for input to a personal computer.

A coating layer 17 is formed on the detection electrodes 5, the drive electrodes 7, and the ground electrodes 9, and the surface of the coating layer 17 is a surface 17a with which a pointing body such as a finger based on an operator is to be in contact.

In addition, the electrostatic capacitance-type position detection device 1 includes a detection circuit 11, a drive circuit 13, and a decision circuit 15.

In the electrostatic capacitance-type position detection device 1, that the electrostatic capacitance of a position at which the pointing body such as a finger based on the operator is in contact with the surface 17a is changed between before and after the contact is used, thereby detecting the contact position.

In other words, in the electrostatic capacitance-type position detection device 1, the drive electrodes 7 are driven in order by the drive circuit 13, and the voltages of the detection electrodes 5 are detected by the detection circuit 11.

In addition, in the decision circuit 15, one of the detection electrodes 5, whose voltage change is detected by the detection circuit 11, and one of the drive electrodes 7, driven by the drive circuit 13 when the relevant voltage change is produced, are identified, thereby identifying the above-mentioned contact position of the surface 17a.

The insulating substrate 3 utilizes an insulating synthetic resin material obtained by impregnating a glass woven fabric with an epoxy resin. The detection electrodes 5, the drive electrodes 7, and the ground electrodes 9 are formed of copper or a copper alloy and subjected to patterning using photolithography.

Figure 2:
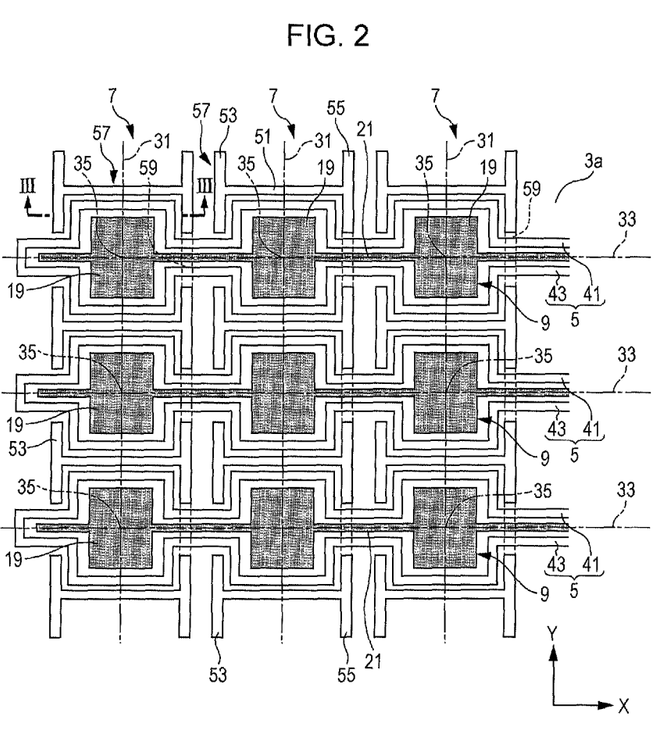
FIG. 2 is an enlarged view of the vicinity of a portion surrounded by a dotted line II in the electrostatic capacitance-type position detection device illustrated in FIG. 1.
Figure 3:
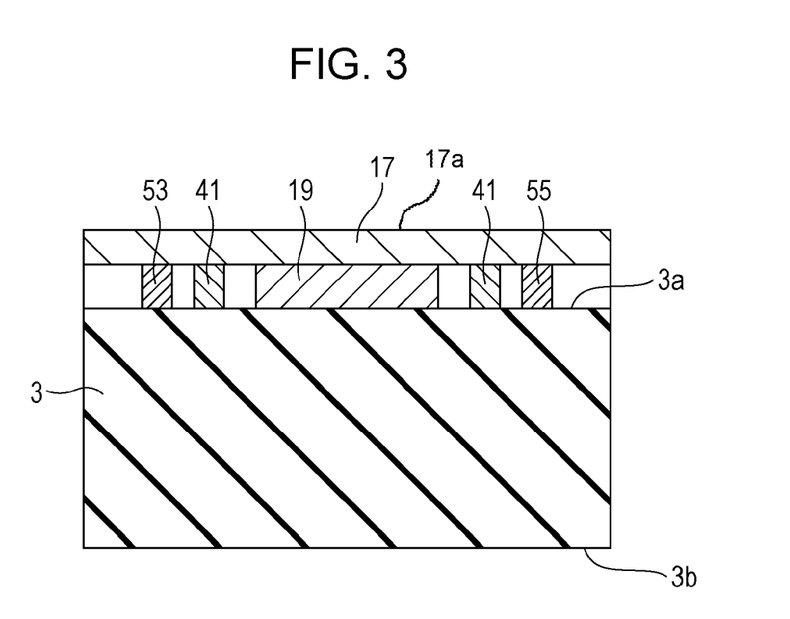
FIG. 3 is a cross-sectional view taken along a cross-section line III-III illustrated in FIG. 2.

FIG. 2 is the enlarged view of the vicinity of a portion surrounded by a dotted line II in the electrostatic capacitance-type position detection device 1 illustrated in FIG. 1. FIG. 3 is a cross-sectional view taken along a cross-section line III-III illustrated in FIG. 2.

As illustrated in FIG. 1 and FIG. 2, the detection electrodes 5 may be arranged in parallel with one another in the Y direction and formed on a surface 3a of the insulating substrate 3 so as to extend in the X direction.

In addition, the drive electrodes 7 may be arranged in parallel with one another in the X direction and formed on the surface 3a of the insulating substrate 3 so as to extend in the Y direction.

In addition, when viewed in plan, on the insulating substrate 3, a first virtual center line 31 parallel to the Y direction with respect to each of the drive electrodes 7 and a second virtual center line 33 parallel to the X direction with respect to each of the detection electrodes 5 are specified.

The first virtual center line 31 is a line that passes through a plurality of intersection points 35 located in the Y direction at a same position in the X direction. The second virtual center line 33 is a line that passes through a plurality of intersection points 35 located in the X direction at a same position in the Y direction.

When the insulating substrate 3 is viewed in plan, the ground electrodes 9 may each include ground regions 19 within which the respective intersection points 35 are located, at the respective intersection points 35 between the respective first virtual center lines 31 and the corresponding second virtual center line 33. In the example illustrated in FIG. 2, each of the ground regions 19 is a rectangle and the gravity center thereof is the corresponding intersection point 35.

Each of the ground electrodes 9 may include a corresponding ground line 21 that connects the ground regions 19 adjacent to each other in the X direction and extends in the X direction.

As illustrated in FIG. 2, the detection electrodes 5 may be formed on the outer sides of the ground regions 19. In addition, the drive electrodes 7 may be formed on the outer sides of the detection electrodes 5 with respect to the intersection points 35.

The detection electrodes 5 may each include a first electrode line 41 and a second electrode line 43 that extend in the X direction and are formed so as to sandwich therebetween the ground regions 19 from the Y direction.

When viewed in plan, the first electrode line 41 and the second electrode line 43 are formed at a substantially equal distance from the rectangular outlines of the ground regions 19 in the vicinities of the ground regions 19.

The first electrode line 41 and the second electrode line 43, located on both sides of the corresponding ground region 19 in the Y direction, are formed so as to be line-symmetrical about the corresponding second virtual center line 33 that passes through the corresponding intersection point 35 within the relevant ground region 19.

Here, the first electrode line 41 and the second electrode line 43 are examples of the first electrode line and the second electrode line, respectively, of the present invention.

A plurality of electrode patterns 57 may be arranged in order in the Y direction, thereby configuring each of the drive electrodes 7.

Each of the electrode patterns 57 may be configured by a third electrode line 51 that extends in the X direction, and a fourth electrode line 53 and a fifth electrode line 55 that are located on both respective ends of the third electrode line 51 and extend in the Y direction.

Here, the corresponding third electrode line 51 may be formed between portions of the corresponding first electrode line 41 and the corresponding second electrode line 43, which are parallel to the X direction and located between the two ground regions 19 adjacent to each other in the Y direction.

In addition, the corresponding fourth electrode line 53 and the corresponding fifth electrode line 55 may be formed so as to face portions of the corresponding first electrode line 41 and the corresponding second electrode line 43, which are parallel to the Y direction.

Here, the third electrode line 51, the fourth electrode line 53, and the fifth electrode line 55 are examples of a third electrode line, a fourth electrode line, and a fifth electrode line, respectively, of the present invention. In addition, the electrode pattern 57 is an example of an electrode pattern of the present invention.

The third electrode line 51, the fourth electrode line 53, and the fifth electrode line 55 may be formed at a substantially equal distance from portions of the corresponding first electrode line 41 and the corresponding second electrode line 43, located so as to face the third electrode line 51, the fourth electrode line 53, and the fifth electrode line 55.

In addition, the respective electrode patterns 57, located on both sides of the corresponding ground region 19 in the Y direction, are formed so as to be line-symmetrical about the corresponding second virtual center line 33 that passes through the corresponding intersection point 35 within the relevant ground region 19.

Furthermore, portions of the first electrode line 41 and the second electrode line 43 surrounding the corresponding ground region 19 from the outside and the electrode patterns 57 located on the outer sides thereof may be formed so as to be line-symmetrical about the corresponding first virtual center line 31 that passes through the corresponding intersection point 35 within the relevant ground region 19.

In a back surface 3b of the insulating substrate 3, sixth electrode lines 59 that each electrically connect the two fifth electrode lines 55 adjacent to each other in the Y direction may be formed. In other words, through-holes (not illustrated) are formed at the positions of both ends of the corresponding fifth electrode line 55 in the insulating substrate 3, and the corresponding fifth electrode line 55 and the corresponding sixth electrode line 59 are electrically connected to each other through the through-holes. From this, an electric connection between the corresponding detection electrode 5 and the corresponding drive electrode 7 is avoided.

In the electrostatic capacitance-type position detection device 1, the area of each of the ground regions 19 may be greater than the area of each of portions of the corresponding detection electrode 5 and the corresponding drive electrode 7, the portions surrounding the corresponding ground region 19. From this, it is possible to strengthen the function of the pointing body such as a finger as a ground conductor, and it is possible to make a function as a floating conductor relatively small. As a result, it is possible to make the inversion sensing error described in the related art smaller, and it is possible to enhance a detection sensitivity.

In addition, in order to reduce the influence of a noise, it is desirable to reduce the area of each of the detection electrodes 5.

In addition, in a direction perpendicular to the surface 3a of the insulating substrate 3, the corresponding sixth electrode line 59 and the corresponding ground region 19 may be formed so as not to overlap with each other.

Hereinafter, the function of the electrostatic capacitance-type position detection device 1 illustrated in FIG. 1 and FIG. 2 will be described.

In the electrostatic capacitance-type position detection device 1, in a case where the contact of the pointing body such as a finger based on the operator occurs on the surface 17a, electrostatic capacitance between the corresponding detection electrode 5 and the corresponding drive electrode 7 in the vicinity of the corresponding intersection point 35 between the corresponding first virtual center line 31 and the corresponding second virtual center line 33 in the vicinity of the relevant contact position is reduced by the above-mentioned contact of the pointing body with the surface 17a.

In the electrostatic capacitance-type position detection device 1, the drive electrodes 7 are driven in order by the drive circuit 13, and the voltages of the detection electrodes 5 are detected by the detection circuit 11.

As described above, the electrostatic capacitance of the detection electrode 5 corresponding to the intersection point 35 located in the vicinity of a position on the surface 17a with which the pointing body is in contact is reduced. Therefore, when the drive electrode 7 corresponding to the relevant intersection point 35 is driven, a voltage change corresponding to the above-mentioned reduction is generated in the corresponding detection electrode 5.

At this time, the center of the corresponding ground region 19 is located at the corresponding intersection point 35. Therefore, the detection sensitivity of the corresponding intersection point 35 does not become high locally.

In addition, in the decision circuit 15, one of the detection electrodes 5, whose voltage change is detected by the detection circuit 11, and one of the drive electrodes 7, driven by the drive circuit 13 when the relevant voltage change is produced, are identified, thereby identifying the above-mentioned contact position of the surface.

As described above, in the electrostatic capacitance-type position detection device 1, the corresponding ground region 19 may be formed at the corresponding intersection point 35 between the first virtual center line 31 for specifying the center of the arrangement of the corresponding detection electrode 5 in the Y direction and the second virtual center line 33 for specifying the center of the arrangement of the corresponding drive electrode 7 in the X direction, and the corresponding detection electrode 5 and the corresponding drive electrode 7 may be formed on the outer side of the corresponding ground region 19. Therefore, it is possible to effectively inhibit the sensitivities of intersection points from becoming excessively high in such a manner as in the related art, and it is possible to effectively inhibit a sensitivity variation from occurring. In other words, according to the electrostatic capacitance-type position detection device 1, portions whose sensitivities are high are distributed around the individual intersection points 35. Accordingly, it is possible to suppress a sensitivity variation due to a position, and it is possible to enhance position detection accuracy. Therefore, in a case where a coating layer formed on the detection electrodes 5, the drive electrodes 7, and the ground electrodes 9 is thin, it is possible to suppress a sensitivity variation, and it is possible to obtain high position detection accuracy.

In addition, in the electrostatic capacitance-type position detection device 1, each of the detection electrodes 5 is formed between the corresponding ground region 19 and the corresponding drive electrode 7. Therefore, it is possible to reduce an amount where an electric field generated from the drive electrodes 7 is absorbed by the ground regions 19. From this, it is possible to improve a detection sensitivity.

In addition, in the electrostatic capacitance-type position detection device 1, the area of each of the ground regions 19 may be made larger than the area of each of portions of the corresponding detection electrode 5 and the corresponding drive electrode 7, the portions surrounding the relevant ground region 19. From this, it is possible to strengthen the function of the pointing body such as a finger as a ground conductor, and it is possible to make a function as a floating conductor small. In addition, it is possible to make the inversion sensing error described in the related art smaller, and it is possible to enhance a detection sensitivity.

In addition, according to the electrostatic capacitance-type position detection device 1, each of the detection electrodes 5 is formed on the inner side of the corresponding drive electrode 7 (on a side closer to the corresponding intersection point 35). Accordingly, it is possible to reduce the area of each of the detection electrodes 5, and it is possible to obtain a high noise resistance characteristic.

In addition, in the electrostatic capacitance-type position detection device 1, the sixth electrode lines 59 that each electrically connect the two fifth electrode lines 55 adjacent to each other in the Y direction may be formed in the back surface 3b of the insulating substrate 3. By doing this way, it is possible to prevent the detection sensitivity of the intersection point 35 between the corresponding fifth electrode line 55 and the corresponding sixth electrode line 59 from becoming high locally. In other words, in a case where the corresponding drive electrode and the corresponding detection electrode are formed in the same surface of the substrate and the insulation layer is formed between the two electrodes, the sensitivity of the corresponding intersection point becomes high. On the other hand, in the present embodiment, it is possible to separate the corresponding fifth electrode line 55 and the corresponding sixth electrode line 59 from each other by the thickness of the insulating substrate 3, and it is possible to prevent a sensitivity from becoming high locally.

In addition, in the configuration in which the insulation layer is formed in such a manner as described above, a variation in an electrostatic capacitance value is generated by the manufacturing variation of the insulation layer, and a characteristic is unstable. By forming the sixth electrode lines 59 in the back surface 3b of the insulating substrate 3 in such a manner as in the present embodiment, it is possible to suppress such a manufacturing error.

In addition, in the electrostatic capacitance-type position detection device 1, by connecting the end portions of the respective fifth electrode lines 55 of the two electrode patterns 57 adjacent to each other in the Y direction by the corresponding sixth electrode line 59, it is possible to reduce the length of each of the sixth electrode lines 59. From this, it is possible to reduce a decrease in detection accuracy due to a noise.

In addition, in the electrostatic capacitance-type position detection device 1, only the sixth electrode lines 59 of the drive electrodes 7 out of the detection electrodes 5, the drive electrodes 7, and the ground electrodes 9 may be formed in the back surface 3b of the insulating substrate 3, and the other configuration may be formed in the surface 3a. Therefore, it is possible to bring the corresponding detection electrode 5 and the corresponding drive electrode 7 close to each other, and a sensitivity becomes high. In addition, it is possible to reduce wiring lines in the back surface 3b of the insulating substrate 3, and it is possible to reduce a noise received by the surface 3a from the back surface 3b.

In addition, it is possible to increase the degree of freedom of the wiring lines in the back surface 3b of the insulating substrate 3.

<Second Embodiment>

Figure 4:
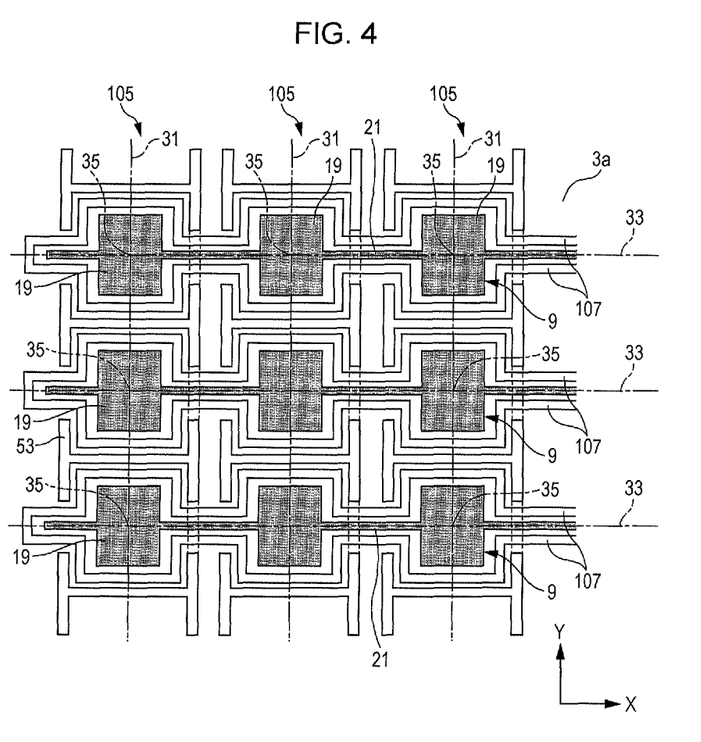
FIG. 4 is a diagram illustrating an electrode pattern of a second embodiment of the present invention.

FIG. 4 is a diagram illustrating an electrode pattern of a second embodiment of the present invention.

As illustrated in FIG. 4, with the exception that the patterns of the detection electrodes and the drive electrodes are reversed with respect to the first embodiment, an electrostatic capacitance-type position detection device of the present embodiment is the same as that of the first embodiment.

As illustrated in FIG. 4, a plurality of detection electrodes 105 may be arranged in parallel with one another in the X direction and formed on the surface 3a of the insulating substrate 3 so as to extend in the Y direction.

In addition, a plurality of drive electrodes 107 may be arranged in parallel with one another in the Y direction and formed on the surface 3a of the insulating substrate 3 so as to extend in the X direction.

The ground electrodes 9 and the ground regions 19 are the same as those in the first embodiment.

As illustrated in FIG. 4, the drive electrode 107 may be located on the outer sides of the ground regions 19. In addition, the detection electrodes 105 may be formed on the outer sides of the drive electrodes 107 with respect to the intersection points 35.

The drive electrodes 107 each have the same pattern as that of the corresponding detection electrode 5 in the first embodiment. In addition, the detection electrodes 105 each have the same pattern as that of the corresponding drive electrode 7 in the first embodiment.

According to the second embodiment, from among the above-mentioned advantageous effects of the first embodiment, it is possible to obtain advantageous effects other than the advantageous effect based on it that the detection electrodes are formed on the inner sides of the drive electrodes.

<Third Embodiment>

Figure 5:
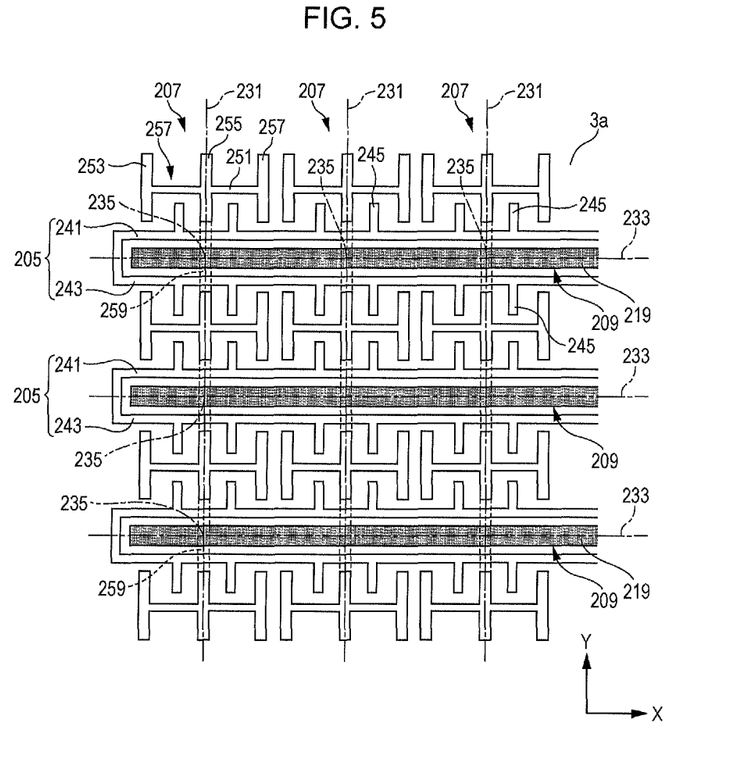
FIG. 5 is a diagram illustrating an electrode pattern of a third embodiment of the present invention.

FIG. 5 is a diagram illustrating an electrode pattern of a third embodiment of the present invention.

The same entire configuration illustrated in FIG. 1 applies to the present embodiment.

As illustrated in FIG. 5, a plurality of detection electrodes 205 may be arranged in parallel with one another in the Y direction and formed on the surface 3a of the insulating substrate 3 so as to extend in the X direction.

In addition, a plurality of drive electrodes 207 may be arranged in parallel with one another in the X direction and formed on the surface 3a of the insulating substrate 3 so as to extend in the Y direction.

In addition, when viewed in plan, on the insulating substrate 3, a first virtual center line 231 parallel to the Y direction with respect to each of the drive electrodes 207 and a second virtual center line 233 parallel to the X direction with respect to each of the detection electrodes 205 are specified.

The first virtual center line 231 is a line that passes through a plurality of intersection points 235 located in the Y direction at a same position in the X direction. The second virtual center line 233 is a line that passes through a plurality of intersection points 235 located in the X direction at a same position in the Y direction.

In the present embodiment, each of ground electrodes 209 is formed by one ground region 219. Each of the ground regions 219 may be formed so that the intersection points 235 located on the corresponding second virtual center line 233 are located therewithin. In the example illustrated in FIG. 5, each of the ground regions 219 is a rectangle.

As illustrated in FIG. 5, the detection electrodes 205 may be located on the outer sides of the ground regions 219. In addition, the drive electrodes 207 may be formed on the outer sides of the detection electrodes 205 with respect to the ground regions 219.

The detection electrodes 205 may each include a seventh electrode line 241 and an eighth electrode line 243 that are formed so as to surround the corresponding ground region 219 and extend in the X direction.

When viewed in plan, the seventh electrode line 241 and the eighth electrode line 243 may be formed at a substantially equal distance from the rectangular outline of the relevant ground region 219 in the vicinity of the relevant ground region 219.

In addition, a plurality of ninth electrode lines 245 may be formed so as to be headed from the seventh electrode line 241 and the eighth electrode line 243 to the outer side of the ground region 219.

The electrode patterns 257 may be arranged in order in the Y direction, thereby configuring each of the drive electrodes 207.

Each of the electrode patterns 257 may be configured by a tenth electrode line 251 that extends in the X direction and a plurality of eleventh electrodes 253, 255, and 257 that extend from the tenth electrode line 251 in the Y direction.

Between the eleventh electrodes 253, 255, and 257, at least portions of the respective ninth electrode lines 245 of the corresponding detection electrode 205 may be located.

In the back surface 3b of the insulating substrate 3, electrode lines 259 that each electrically connect the two eleventh electrode line 255 adjacent to each other in the Y direction may be formed. In other words, through-holes (not illustrated) are formed at the positions of both ends of the corresponding eleventh electrode line 255 in the insulating substrate 3, and the two eleventh electrode lines 255 and the corresponding electrode line 259 are electrically connected to each other through the through-holes. From this, an electric connection between the corresponding detection electrode 5 and the corresponding drive electrode 7 is avoided.

According to the present embodiment, the same advantageous effects as those of the first embodiment are obtained.

The present invention is not limited to the above-mentioned embodiments.

In other words, regarding the configuration elements of each of the above-mentioned embodiments, those skilled in the art may perform various modifications, combinations, sub-combinations, and alternations within the technical scope of the invention or the equivalents thereof.

While, in the above-mentioned first embodiment, a case where the sixth electrode lines 59 that each electrically connect the two fifth electrode lines 55 adjacent to each other in the Y direction are formed in the back surface 3b of the insulating substrate 3 is exemplified, the sixth electrode lines 59 may be formed in the surface 3a of the insulating substrate 3. In other words, formation by two layers may be adopted. In this case, an insulation layer is formed between the corresponding first electrode line 41 and second electrode line 43 and the corresponding sixth electrode line 59.

In addition, the present invention may be applied to a case where the detection electrodes 5, 105, or 205, the drive electrodes 7, 107, or 207, and the ground electrodes 9, 109, or 209 are formed by three or more layers.

In addition, the shapes and the arrangements of the detection electrodes 5, 105, or 205, the drive electrodes 7, 107, or 207, and the ground electrodes 9, 109, or 209, described above, are examples, and these are not limited in particular if falling within a scope identified by the invention of one of the attached Claims.

In addition, while, in the above-mentioned embodiments, a case where the present invention is applied to a touch pad or the like used for input to a personal computer, the present invention may be applied to another device, a touch panel, and so forth.

What is claimed is:

1. An electrostatic capacitance-type position detection device comprising:
   a plurality of first electrodes arranged in parallel with one another in a first direction and disposed in a substrate so as to extend in a second direction perpendicular to the first direction;
   a plurality of second electrodes arranged in parallel with one another in the second direction on the substrate and disposed in the substrate so as to extend in the first direction; and
   a ground electrode in the substrate, wherein:
   wherein the first electrodes each include a first electrode line and a second electrode line that extend in the second direction and are disposed so as to sandwich therebetween the corresponding ground region from the first direction;
   one electrode out of each of the first electrodes and each of the second electrodes is electrically driven, an electric output of the other electrode is detected, and a position to which an object is close on the substrate is detected based on the detection result, wherein
   at an intersection point between a first virtual center line of each of the second electrodes, which is parallel to the first direction, and a second virtual center line of each of the first electrodes, which is parallel to the second direction, the ground electrode has a ground region within which the intersection point is located when the substrate is viewed in plan,
   the corresponding first electrode is on an outer side of the ground region, and
   the corresponding second electrode is on an outer side of the corresponding first electrode with respect to the corresponding intersection point.

2. The electrostatic capacitance-type position detection device according to claim 1, wherein
   the ground electrode includes a ground line that connects the two ground regions adjacent to each other in the second direction and extend in the second direction.

3. The electrostatic capacitance-type position detection device according to claim 2, wherein
   the second electrodes each include
   a plurality of electrode patterns, each including a third electrode line that extends in the second direction, and a fourth electrode line and a fifth electrode line that are located on both respective ends of the third electrode line and extend in the first direction, the electrode patterns being configured to be disposed in order in the first direction, and
   the third electrode line is between the corresponding first electrode line and the corresponding second electrode line, located between the two ground regions adjacent to each other in the first direction, and the fourth electrode line and the fifth electrode line are on outer sides of the corresponding first electrode line and the corresponding second electrode line with respect to the corresponding intersection point.

4. The electrostatic capacitance-type position detection device according to claim 3, wherein
   the first electrodes, the second electrodes, and the ground regions are in a first surface of the substrate, and a sixth electrode line electrically connect the fifth electrode lines of the second electrodes adjacent to each other in the first direction is disposed in a second surface opposite to the first surface of the substrate.

5. The electrostatic capacitance-type position detection device according to claim 4, wherein
the corresponding sixth electrode line and the corresponding ground region are disposed so as not to overlap with each other, in a direction perpendicular to the first surface of the substrate.

6. The electrostatic capacitance-type position detection device according to claim 5, wherein
the first electrodes each include a seventh electrode line and an eighth electrode line, which extend in the second direction and disposed so as to sandwich therebetween the corresponding ground region from the first direction, and a plurality of ninth electrode lines that extend from the seventh electrode line and the eighth electrode line toward the corresponding second electrode,
the second electrodes each include a plurality of electrode patterns, each including a tenth electrode line that extends in the second direction and a plurality of eleventh electrode lines that extend from the tenth electrode line in the first direction, and disposed in order in the first direction, and
at least portions of the respective ninth electrode lines are located between the two eleventh electrodes adjacent to each other in the second direction.

7. The electrostatic capacitance-type position detection device according to claim 1, wherein
an area of each of the ground regions is greater than an area of a portion of the corresponding first electrode or the corresponding second electrode, the portion surrounding the corresponding ground region.

8. The electrostatic capacitance-type position detection device according to claim 1, wherein
the first electrodes are each the other electrode, and
the second electrodes are each the one electrode.

9. The electrostatic capacitance-type position detection device according to claim 1, wherein
the ground regions are disposed so that the intersection points located on each of the second virtual center lines are located therewithin, and
the first electrodes are each disposed so as to surround the corresponding ground region inward.

10. An electrostatic capacitance-type position detection device comprising:
a plurality of first electrodes arranged in parallel with one another in a first direction and disposed in a substrate so as to extend in a second direction perpendicular to the first direction;
a plurality of second electrodes arranged in parallel with one another in the second direction on the substrate and disposed in the substrate so as to extend in the first direction; and
a ground electrode in the substrate, wherein
one electrode out of each of the first electrodes and each of the second electrodes is electrically driven, an electric output of the other electrode is detected, and a position to which an object is close on the substrate is detected based on the detection result, wherein
at an intersection point between a first virtual center line of each of the second electrodes, which is parallel to the first direction, and a second virtual center line of each of the first electrodes, which is parallel to the second direction, the ground electrode has a ground region within which the intersection point is located when the substrate is viewed in plan,
in plan view, the corresponding first electrode is on an outer side of the ground region, and
in plan view, the corresponding second electrode is on an outer side of the corresponding first electrode with respect to the corresponding intersection point.

\* \* \* \* \*